United States Patent [19]

Walsh

[11] Patent Number: 4,660,144
[45] Date of Patent: Apr. 21, 1987

[54] ADJUNCT MACHINE
[75] Inventor: James R. Walsh, Hyde Park, N.Y.
[73] Assignee: International Business Machines Corp., Armonk, N.Y.
[21] Appl. No.: 737,355
[22] Filed: May 23, 1985
[51] Int. Cl.$^4$ .............................................. G06F 15/16
[52] U.S. Cl. .................................................... 364/200
[58] Field of Search ......................... 364/200 MS File

[56] References Cited
U.S. PATENT DOCUMENTS
4,456,954 6/1984 Bullions, III et al. .............. 364/200

Primary Examiner—Raulfe B. Zache
Attorney, Agent, or Firm—Joseph A. Biela

[57] ABSTRACT

Adjunct virtual machines are disclosed that are connected to an existing base virtual machine to provide for the creation of service processors each providing a service to the base virtual machine. All communication with the user takes place through one console that is shared by the base virtual machine and its adjunct virtual machine. That is, all messages and responses between the base virtual machine and the adjunct virtual machines are directed to only one console such that each adjunct machine does not require its own separate console. Even though only one console is used, there is no requirement for one machine to log off while an operating system control program (SCP) function is executing in the other machine. As a result, implementation of the adjunct virtual machine permits the construction of host SCP console functions that have sustaining dialogs with the user while all other SCP functions are available to the user during the dialog. A single directory is used to define the architecture of the adjunct virtual machine which can be used, as a prototype, by all base virtual machines. The adjunct machine gains control when it is dispatched with a suitable program status word.

12 Claims, 9 Drawing Figures

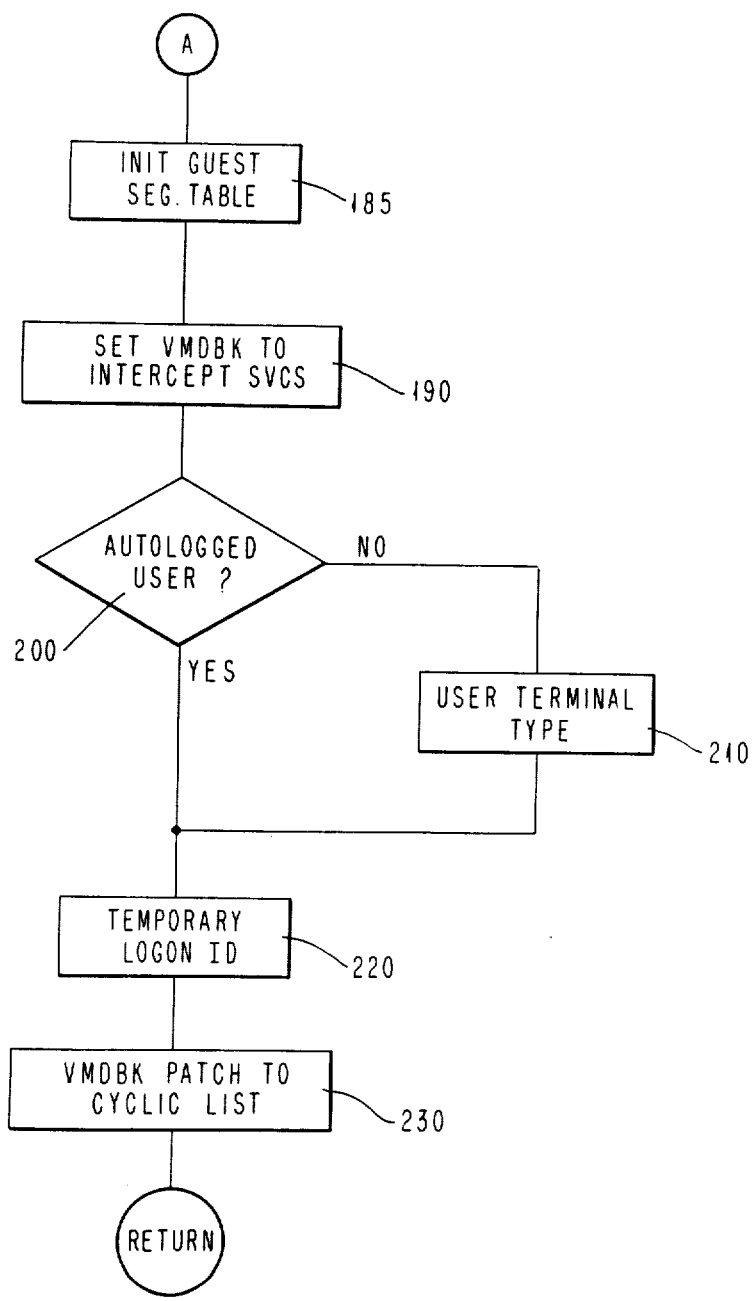

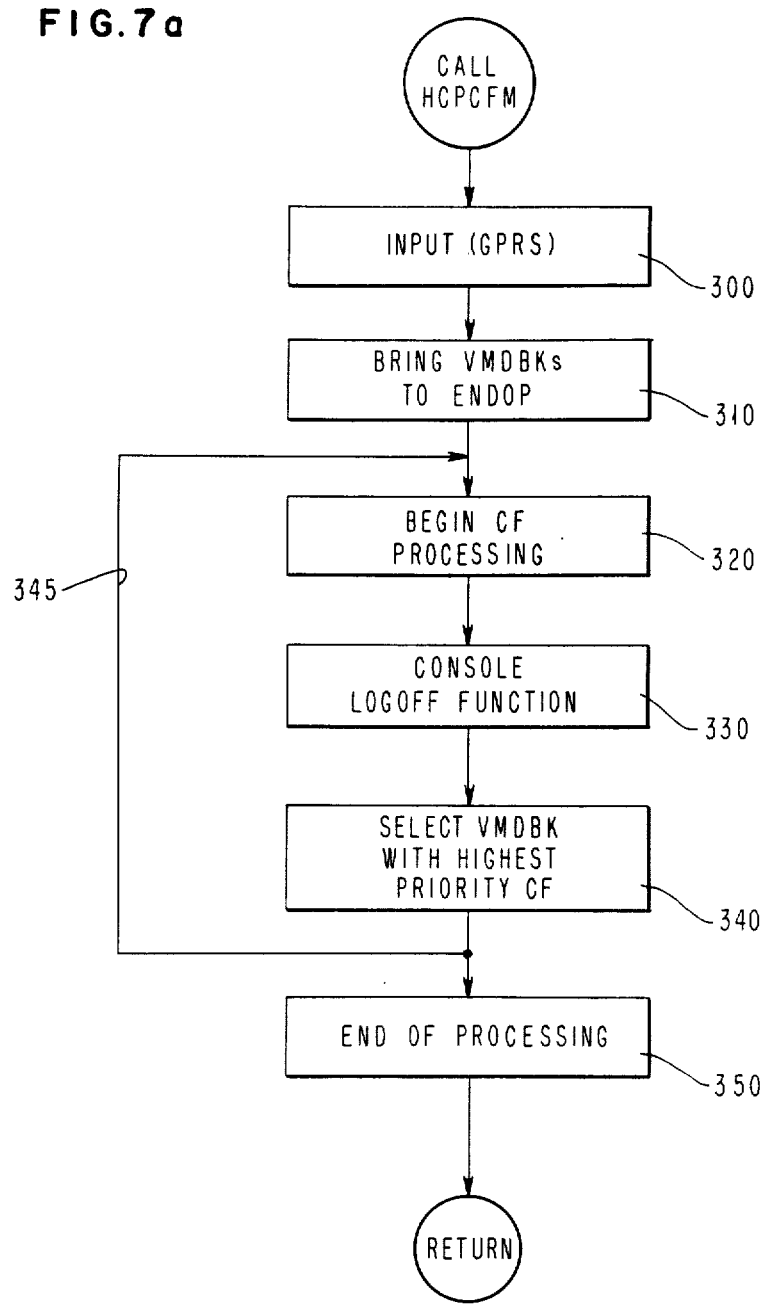

ADJUNCT MACHINE

BACKGROUND OF THE INVENTION

1. Field of the Invention

This invention generally relates to virtual machines which are guest machines of real (host) machines. In particular, this invention relates to adjunct virtual machines that either serve the virtual (base) machines or that form a multi-processing configuration.

2. Prior Art

When a virtual guest logs on to either a real (host) uniprocessor (UP) system or a real (host) multi-processor (MP) system, a virtual machine definition control block (guest VMDBK) is created in a region of host storage. This area contains all of the device information and control blocks necessary to define a guest. The pointer for this guest VMDBK is found in the SYSGEN common area in the reserved storage region, i.e. within the host nucleus. At any point during the operation of the data processing system, the running guest VMDBK will be one of several types, e.g. IBM System/370-XA or IBM System/370. Its type is assigned when the VMDBK is created and may be altered by definition commands. The address of the virtual CPU which the VMDBK represents will be contained in a chain of VMDBKs called the global cyclic list (VMDCYCLE) if more than one guest logs on to the system. A guest VMDBK includes: (1) the guest state descriptor (SD) which describes the virtual guest to the host system, (1a) a description of the guest's mode (or type), i.e. System/370, (1b) the guest's storage size, (1c) the guest program status word (PSW), (1d) contents of the guest's control registers 0 through 15, (2) the contents of the guest's general purpose registers 0 through 15, and (3) the guest's floating point registers 0 through 6.

U.S. Pat. No. 4,456,954 issusd to Bullions, III et al. and assigned to the same assignee as the present application describes a start interpretive execution (SIE) instruction which enables a virtual (guest) uniprocessor system to be emulated in a real UP or in a real MP system. SIE consists of an operation code and an operand address of a control block in real main storage (MS). This control block is the state descriptor (SD) and is included with the guest VMDBK as stated above. The SD contains a plurality of fields which receive data that define the state of a virtual system, i.e. a virtual CPU with a virtual storage, and certain states for controlling how the virtual system is to operate on the real (host) system. Therefore, one SD, existing in real main storage, defines a virtual UP system, i.e. one virtual guest. More than one SD defines a plurality of virtual UP systems, i.e. a plurality of guests. The plurality of virtual guests are operated on when the real (host) system serially executes SIE instructions each specifying a virtual guest by its corresponding SD. A process called invoking SIE occurs whenever a SIE instruction is executed in a host program's instruction stream. This process provides for the guest to be emulated by enabling microcode and hardware in the real CPU to support the virtual guest invoked by the SIE instruction. After the SIE instruction is invoked, the guest program begins execution for the virtual guest defined by the SD which is pointed to by the SIE instruction.

Virtual MP systems may also be provided in a real MP system which includes a plurality of real CPUs which are tightly coupled to a common real main storage. In such real MP systems, the plurality of virtual MP systems is defined by a respective plurality of VMDBKs in real main storage in the same manner as described above for a real UP system. Thus, each of the plurality of VMDBKs defines a different virtual guest in the real MP system. Any one or more of the plurality of real CPUs in an MP system may, at any time, be in emulation mode in which a guest program executes under a respective SIE instruction. In other words, a plurality of virtual MP systems, identified by different VMDBKs in the real MP main storage, can execute program simultaneously.

A further description of interpretive execution is found in an article by P. H. Gum in the IBM Journal of Research and Development, Volume 27, Number 6, November 1983, entitled "System/370 Extended Architecture: Facilities for Virtual Machines". Additional pertinent information is found in co-pending U.S. patent application Ser. Nos. 561,614 and 635,388 which have the same assignee as the present application.

Pertinent art is also described in an article by G. D. Bagley entitled "The Scout—An Extended Virtual Machine", which was referenced in, *Computer,* IEEE, Vol. 9, No. 2, February 1976, pages 38–42. In the Scout machine, a portion of the guest real storage, having a primary guest operating system, is reserved for a special (secondary) guest operating system which is capable of modifying the primary guest operating system. A number of problems made the Scout machine concept generally unacceptable. For example, two consoles are needed to avoid conflicts between the guest operating systems, the special guest operating system is modified in order to handle page zero and I/O interrupts are interpreted so that they are reflected to the correct operating system. Furthermore, there is loss of real storage from the primary to the secondary guest operating system.

An object of this invention is to make available to the user all other system control program console functions during the execution of a system control program console function.

An object of this invention is to create a prototype adjunct virtual machine CPU that provides a service to a base virtual machine CPU and that can be used as a model for every base virtual machine that requires that service.

A further object of this invention is to define the architecture of the adjunct virtual machine CPU in a single directory for creating a prototype adjunct virtual machine CPU only once for use by any number of virtual systems.

An object of this invention is to utilize one console for both the virtual system and its adjunct virtual machines.

Another object of this invention is to utilize adjunct virtual machines in either a guest service or a guest multiprocessor configuration.

A further object of this invention is to create adjunct virtual machines that provide services for either a V=V or a V=R guest.

A processor which serves another processor (or several processors) is known in the art. From the point of view of hardware, a service processor, e.g. the IBM 3082, provides service and diagnostic functions for a real (main) UP system, e.g. the IBM 3083, or for a real (main) MP system, e.g. the IBM 3081. (The IBM 3081 includes two integrated central processing units, each having equal access to central storage and two sets of channels that link it with input/output (I/O) devices.) The service processor shares the storage of the UP or MP systems which it services.

A processor which serves another processor is shown by the data processing system of FIG. 1. In particular, the data processing system includes an MP system having first and second (real) CPUs (CP0, CP1), system controller (SC), main storage (MS) and external data controller (EXDC). Each CPU includes a buffer control element (BCE), instruction element (IE), execution element (EE) and control storage element (CSE). During system initialization, the microcode is loaded into a buffer and into a designated (system) area in MS. The CSE supplies the microcode controls to the IE. The IE is that portion of the CPU that, under microcode control, receives and interprets instructions from MS and dispatches the operands to the appropriate executing area. Storage operands are fetched by the IE from the BCE. The BCE controls the data path between the CPU and the SC, and the data paths within the CPU. The EE processes instructions under hardware control. The EXDC provides the hardware and microcode controls to support I/O channels for control units and I/O devices.

Also included in the data processing system of FIG. 1 is a (real) service processor (SP) which provides and performs functions for the MP system. For example, the SP provides control-unit functions for substantially all consoles, and provides for the monitoring and supervising of all operations in the MP system. The service processor has access to the real CPUs of the MP system and MS as represented by the dotted lines in FIG. 1.

An object of this invention is to utilize adjunct virtual service machines that do not share the storage of the main UP or MP configuration.

SUMMARY OF THE INVENTION

A data processing system is disclosed and claimed which has a real machine with a real CPU, main storage, I/O devices and a host operating system running in the real CPU for controlling the I/O devices, and a base virtual CPU with a guest operating system running in the base virtual CPU. The system comprises adjunct virtual machines having adjunct virtual CPUs connected to the base virtual CPU. The host operating system program is executed in the real CPU along with a guest operating system program, which is executed in the base virtual machine, and at least one program which is executed in each of the adjunct virtual machines.

BRIEF DESCRIPTION OF THE DRAWINGS

FIGS. 6a-b is a flowchart showing the creation and partial initialization of a VMDBK for a user of the data processing system of FIG. 2; and FIGS. 7a-b is a flowchart showing how console function processing can begin after the virtual MP is held at ENDOP and, in particular, how selected user VMDBKs share the same console.

DESCRIPTION OF THE PREFERRED EMBODIMENT

Figure 1:
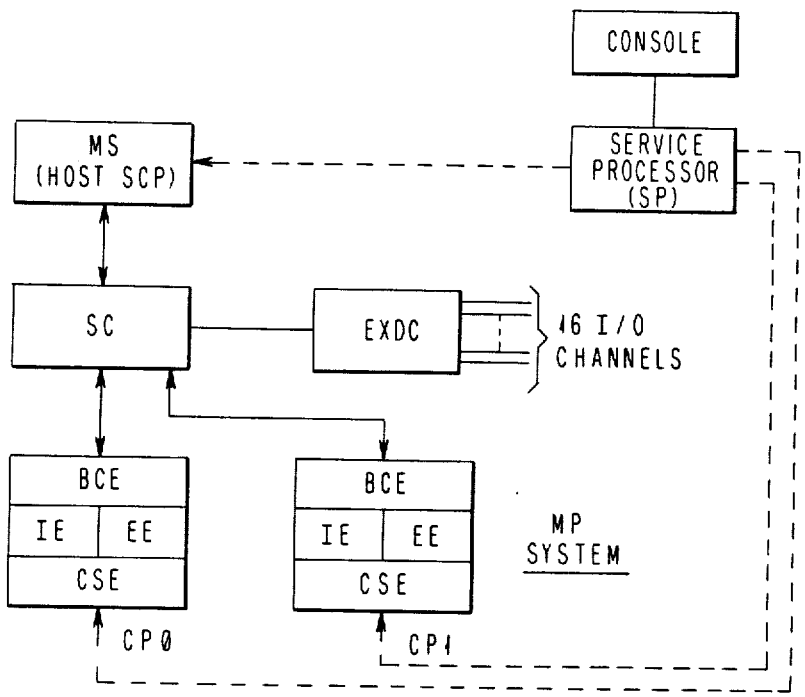
FIG. 1 is a schematic block diagram of a data processing system with an MP system and a real service processor.
Figure 2:
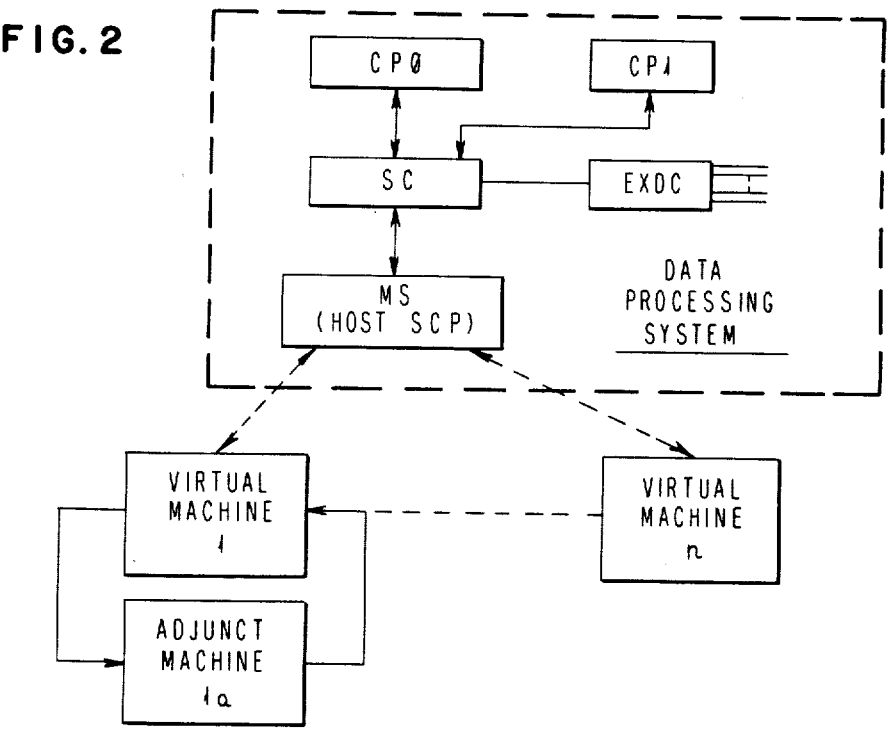
FIG. 2 is a schematic block diagram of the MP system of FIG. 1 including guest virtual machines and an adjunct machine which is the subject of the invention disclosed and claimed herein.

An adjunct machine is a virtual machine that is constructed (connected) in parallel with an existing virtual machine as shown in the data processing system of FIG. 2. In this case, virtual machine 1 is referred to as the base virtual machine or base CPU. The base CPU and adjunct machine 1a are guests of a host operating system in the main storage of a data processing system. (Other virtual machines, such as virtual machine n, can be constructed as guests of the host operating system in MS.) The adjunct virtual machine shares the virtual machine console with its base machine. Since the adjunct machine has an affinity to a particular virtual machine, functions can be created that execute in the adjunct machine with whatever activity is being processed in the base machine. With all adjunct machine communication taking place through the same console as that of the base machine, there is no requirement to LOGOFF or DISCONNECT from the base machine to proceed with the function that executes in the adjunct machine. (In the adjunct machine environment, the virtual machine operator's console is the device the adjunct machine operator uses to communicate with the SCP.) This aspect of the adjunct machine permits the construction of host operating system control program (SCP) console functions that have sustaining dialogs with a user (of the base machine) and further permits all other SCP functions to be available to the user during such a dialog. This overcomes the usual unavailability (to the user) of all other SCP console functions during the execution of a console function. Also, any large process that performs a service that does not logically belong within the SCP can be provided as part of (as a program in) an adjunct machine where it can utilize the virtual machine system scheduling and dispatching functions, but still be isolated from the SCP and accounting processing. Such a service function can be a spool file editor program, a SCP EXEC-type facility or a format program. By placing the program in an adjunct machine, the service program (or function) is isolated from the internal functional areas of the SCP thereby reducing the vulnerability of the host SCP to an error in the service program. Application program(s) as well as operating system program(s) and service programs can be executed in each adjunct machine.

Figure 5:
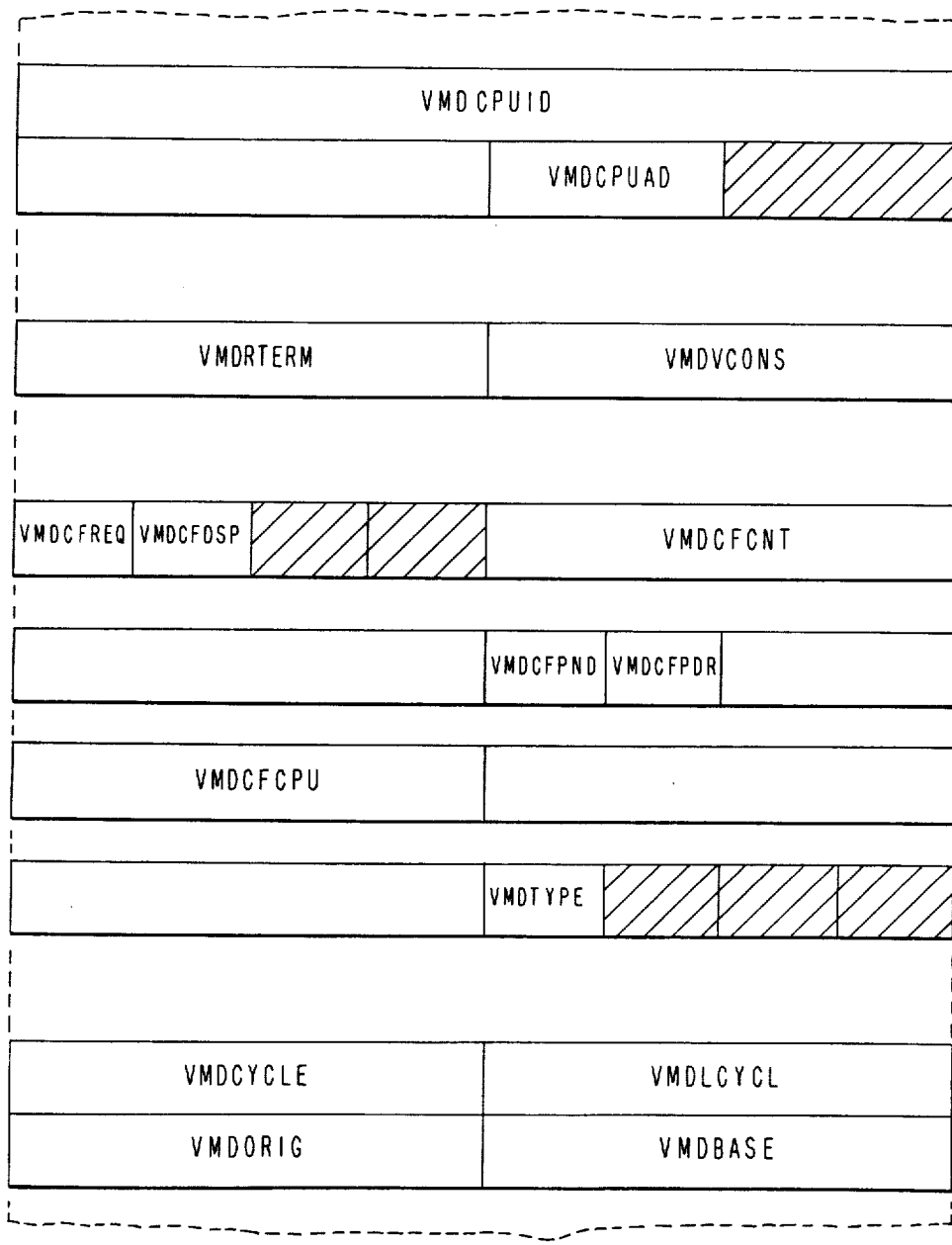
FIG. 5 shows entries in a guest VMDBK.

An adjunct machine is constructed by a call to module HCPBVM to create a VMDBK and by a call to the LOGON module. (In particular, module HCPLOG is called for constructing virtual I/O devices and module HCPBVM for constructing virtual CPUs. Module HCPBVM creates and partially initializes VMDBKs. Modules HCPLOG and HCPLGN provide the remaining entries in the VMDBK fields. Module HCPLOG calls HCPUDR, which is the module that uses the directory entry for further VMDBK creation. Some of these modules are further described below.) The caller (user) identifies the type of adjunct machine to be built. If LOGON is used to construct the adjunct machine, i.e. when a user issues a SCP command that invokes a module (HCPADJ) that controls the adjunct machine creation and sets up its storage, a directory entry is used to define a virtual machine and its configuration. That is, the directory defines the configuration of a base virtual machine and any initial adjunct machines that will form a guest MP system with the base CPU. At some later time, the user can define additional adjunct machines to be used either as additional processors in an MP configuration or as service processors running some service function. An adjunct (virtual) machine is created by building an adjunct virtual machine definition block (adjunct VMDBK) having fields and addresses that point to associated control blocks as well as the VMDBK for the user. This adjunct VMDBK is similar, in format and function, to a guest (base) VMDBK. Both VMDBKs are created by the host operating system, i.e. initially by module HCPBVM (discussed below), to establish the virtual machine configuration. The adjunct VMDBK may be tightly coupled to the base VMDBK, in which case it will share storage and may also share its I/O, or it may create a loosely coupled service system such that the adjunct VMDBK may differ from the base VMDBK and have its own storage and I/O. A virtual I/O configuration is created by the host operating system, i.e. by module HCPLOG, by providing simulations of the specified I/O as a series of attachments to the base VMDBK. Several of the fields of a typical VMDBK are shown in FIG. 5. The address of the adjunct machine CPU, which the adjunct VMDBK represents, is contained in a chain called the local cyclic list (VMDLCYCL). The adjunct VMDBK further includes the adjunct machine state descriptor which describes the adjunct machine to the base CPU. Also, there is a VMDTYPE field which identifies the type of a VMDBK: base (EQU VMDTYPUS) or adjunct (EQU VMDTYPAD).

An adjunct machine is created for the purpose of providing a service to the base CPU, e.g. executing sequences of control program commands. Such a service adjunct machine needs to be loaded with a program, i.e. a guest operating system, in order to be enabled. The program could be loaded from a direct access storage device in the virtual machine configuration following an initial program loading (IPL) or the program could be loaded, by the host, as software modules from a number of host operating system resident devices. (In other words, the SCP may have preserved an image of a guest operating system in a system data file that is reloaded into guest storage.) The selected (IPLed) SCP can create work for each adjunct machine CPU in the guest MP configuration and the host operating system, in turn, can dispatch the adjunct machine CPUs. (It is generally understood that virtual machines initially enter the virtual machine SCP command environment after the virtual machine user has entered the SCP IPL command.) Adjunct machines are built to run concurrently with the base machine or to alternate with the base machine. The storage of an adjunct machine is different than that of the base machine (as is the case for service adjunct machines). Adjunct machines, as currently implemented, do not share any storage with the real MP or UP configuration.

Figure 3:
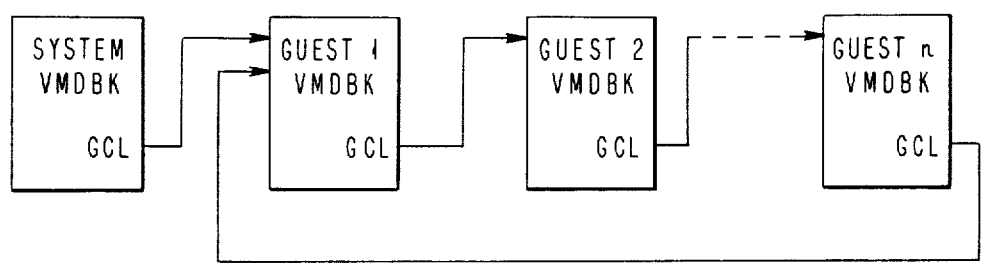
FIG. 3 shows system and guest VMDBKs linked together in a global cyclic list.
Figure 4:
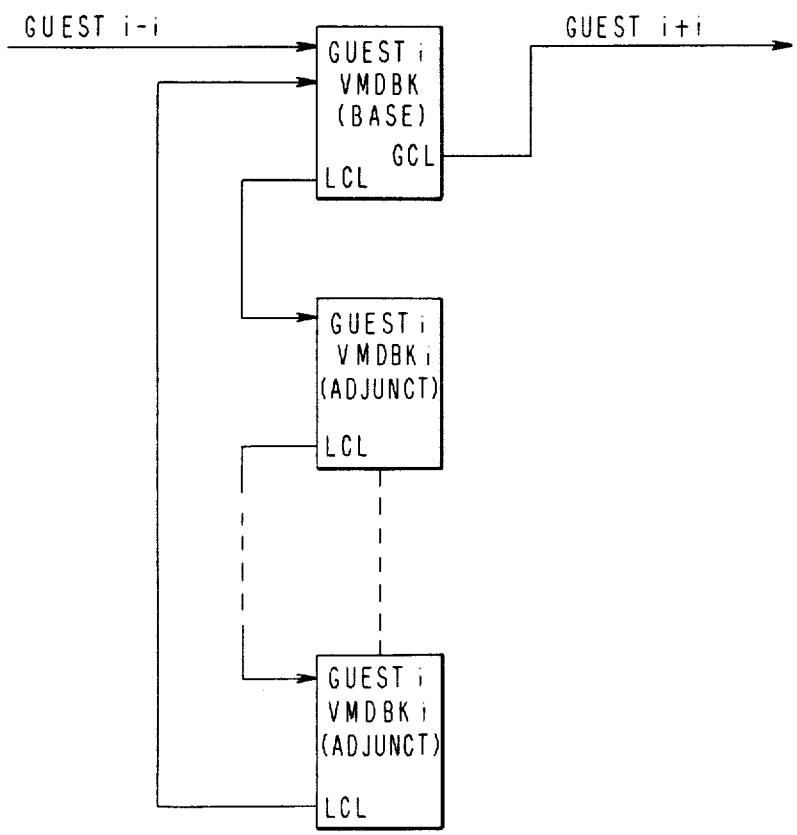
FIG. 4 shows a guest VMDBK linked with adjunct VMDBKs in a local cyclic list.

Since each adjunct machine is associated with a particular base virtual machine, adjunct machines linked to the same base machine are chained in a local cyclic list and not in the normal global cyclic list (GCL). A global system cyclic list contains the base virtual machine for each active user of the system. In other words, for each active user there is a base virtual machine (a guest) represented by a virtual machine definition block (guest VMDBK) as shown in FIG. 3. FIG. 3 shows a guest VMDBK for each of 1 through n users (guests) wherein each guest VMDBK contains a pointer to one other guest VMDBK. The first guest VMDBK is pointed to by a pointer in a SYSTEM VMDBK which represents the real machine operating system (host operating system). (The SYSTEM VMDBK is a fixed portion of the SCP and is created for use by the system at system initialization time. All subsequent VMDBKs are added to the chain, i.e. global cyclic list, that starts with and is terminated by the SYSTEM VMDBK.) The chain of VMDBK pointers (VMDCYCLE) starting at the SYSTEM VMDBK, which points to the first guest VMDBK, through to the $n^{th}$ guest VMDBK, which points back to the first guest VMDBK, forms the global system cyclic list. Since the cyclic list is tied to the SYSTEM VMDBK, the system can detect each active base virtual machine (for all active users) by searching the global cyclic list. However, when adjunct machines are constructed with a base virtual machine, a local cyclic list (LCL) of VMDBKs is also created. In other words, the local cyclic list is only tied to the base virtual machine (a single user) and thus generally excludes system (host) commands from detecting adjunct machines while searching the global cyclic list of virtual machines that are active on the system. Referring to FIG. 4, if the $i^{th}$ guest (i=1 through n) utilized one or more adjunct machines, a local cyclic list would be created whereby the $i^{th}$ guest VMDBK (base machine) would point to the first $i^{th}$ guest adjunct machine VMDBK. The chain of VMDBK pointers starting at the $i^{th}$ guest VMDBK, through to the last $(k^{th})$ $i^{th}$ guest adjunct machine VMDBK, which points (back) to the $i^{th}$ guest VMDBK, forms the local cyclic list. The VMDBK representing the $i^{th}$ base machine still remains in the global cyclic list, but the system cannot detect (is isolated from) the adjunct machines linked to the $i^{th}$ base machine. Since the local cyclic list pertains only to a single user's system and is separate from the global cyclic list, a search of the global cyclic list would only show each active base virtual machine, i.e. each guest VMDBK, and not the adjunct machines, i.e. each adjunct VMDBK. As a result, the local cyclic list for one active base virtual machine can contain mnemonic VMDBK names that are duplicates of VMDBK names used in cyclic lists for other active base virtual machines. This would not be allowed if the local cyclic lists were part of the global list. Therefore, a single directory definition of an adjunct machine can serve as a prototype (define the architecture of a type of adjunct machine) for every user (base virtual machine) who (issues a command that) requires the service of that particular type of adjunct machine. In other words, an adjunct machine, providing service functions such as editing spool files or issuing and executing sequences of host control program commands, will be defined only once rather than each time for each user who might require these services. In general, a directory definition for an adjunct machine can be used as a prototype to create an arbitrary number of customized adjunct machines during a single system session. This prototyping can be used to define many similar adjunct machines for a single base virtual machine or for any number of different base virtual machines. The directory is a file maintained by a system programmer that contains a series of records that describe each initial virtual machine configuration, i.e. the I/O devices and base and adjunct virtual machines, required by the user. (The directory is a series of control blocks, in a designated area on a system volume, i.e. disk packs, etc., used to control access to the system and to provide statements describing the specific virtual machine configuration for the user who is about to log on. The statements include userid, device configuration and initial setup of the virtual machine that will be created for the user at LOGON. The directory is also used to validate requests to access a direct access storage device (DASD) volume defined in the directory as being owned by a user other than the one requesting the access.)

If a virtual MP system is created using adjunct virtual machines, then information in the directory indicates the maximum number of adjunct CPUs for each active base virtual machines. For multi-processor configurations, each adjunct CPU has the same architecture as the base CPU, i.e. either IBM System/370 or IBM System/370 extended architecture. However, as indicated above, if an adjunct machine is being used for service functions, e.g. editing spool files, the directory will define the architecture of the adjunct machine which is different than the architecture of the base CPU. As a result, the adjunct machine performing the service can utilize IBM System/370 architecture while its base machine can utilize IBM System/370 extended architecture. The directory definition of the service adjunct machine will be used as a prototype to create additional adjunct machines to perform the same service if required.

A typical directory includes the following entries:

1. User identification, authority classification and accounting data.
2. Kind of directory, e.g. normal or prototype (service adjunct machine).
3. User's CPU description (System/370 or System/370-XA).
4. Number of adjunct CPUs that may be defined.
5. Default and maximum guest (base virtual machine) real storage sizes.
6. Commands that connect user to shared direct access storage devices.
7. Definition of user's own direct access storage devices.
8. User printer, punch, card reader and console configuration.
9. Device (if any) to be automatically initial program loaded (IPLed).

The VMDBK contains status information about the virtual machine. Information about a virtual machine not contained in the VMDBK is pointed to by pointers anchored in the VMDBK. For example, a VMDBK contains pointers to the VDEVs that describe the virtual machine's I/O configuration. (A VDEV contains such information as the device type, queued I/O requests, queued tasks and pointers to its owner VMDBK and its associated RDEV.) A typical VMDBK, partially shown in FIG. 5, includes the following fields:

1. VMDCYCLE is a global cyclic list chain pointer that functions as a forward pointer for the GCL chain. All guest VMDBKs in the system are linked in a single threaded chain anchored in the SYSTEM VMDBK as shown in FIG. 3. The SYSTEM VMDBK is not, however, in the cyclic list.
2. VMDLCYCL functions as a forward pointer for the local cyclic list chain. In an adjunct virtual machine configuration, the local cyclic list is used to link all of the adjunct virtual CPUs in the configuration. The local cyclic list is a single threaded, forward pointing chain anchored in a base VMDBK as shown in FIG. 4.
3. VMDORIG contains the address of the guest (base) VMDBK which is established at LOGON and is the anchor for the local cyclic list. The adjunct virtual VMDBKs are defined from the base VMDBK. All of the adjunct VMDBKs use the VMDORIG field to address the base VMDBK of the location configuration.
4. VMDBASE contains the address of the VMDBK owning the storage and I/O configuration. (VMDBASE points to the adjunct VMDBK for all adjunct machines.)
5. VMDTYPE contains a code that identifies the type of VMDBK, e.g. the SYSTEM VMDBK, the user VMDBK (resulting from a logon), an adjunct VMDBK, a defined CPU VMDBK (part of a virtual MP configuration), etc.
6. VMDCFREQ is the console function entry flag. This field indicates when a base VMDBK has been requested to enter module HCPCFM (discussed below) to support console function entry requirements. This field is used to ensure that all VMDBKs enter HCPCFM before any console functions are processed. This is part of the technique to require all VMDBKs in the local cyclic list to reach ENDOP (the point at which a CPU is idle) before processing console functions.
7. VMDCFDSP is the console function ENDOP flag. This field indicates when a guest is held at ENDOP for console function mode. Module HCPCFM sets this field whenever a VMDBK is stopped to enter console function mode. This field is reset before another VMDBK begins to run.
8. VMDCFCPU contains the address of the VMDBK in an MP configuration that is to receive SCP commands. An adjunct VMDBK associated with a base CPU (having a base CPU address) will be assigned to this field.
9. VMDRTERM contains the user display station real device block address. This is the RDEV of the terminal that the user logged onto.
10. VMDVCONS contains the address of the virtual device block (VDEV) for the guest system console.
11. VMDCPUID identifies the guest CPU which is specified at logon when the guest VMDBK is created.
12. VMDCPSER identifies the guest CPU serial number which is specified at logon or in the guest's directory.
13. VMDCPUAD contains the binary address of the virtual CPU which a VMDBK represents.
14. VMDCFCNT contains the console function ENDOP count. A positive value in this field indicates a count of running VMDBKs in a virtual configuration. A zero value indicates an idle configuration, i.e. all CPUs in the virtual configuration are at ENDOP. A negative value, i.e. (−1), indicates that a console function is running for the configuration. This field is the CONSOLE FUNCTION LOCK, used to serialize the processing of console functions. Once held exclusively (VMDCFCNT=0), a console function task is running and no second console function task may begin. (This field will be changed by module HCPCFM exit processing.)
15. VMDCFPND indicates that console function is pending. This field controls the processing of the console function task for a virtual machine configuration. Once the CF task begins (VMDCFREQ=FFhex), this field is set to zero to keep the CF task active as long as there are (possibly) more console functions to handle.

16. VMDCFPDR is assigned all ones when all current console READ requests have been processed. This field is tested to ensure that no new READ requests are pending. If the field contains zeroes, a CP READ is scheduled for the VMDEBK in which the field is located.

All console (terminal) operations for either the adjunct virtual machine or the base virtual machine are administered by the host operating system through module HCPCFM (CP's Console Function Manager). (A console is considered to be that aspect of the actual terminal that is used to communicate with the virtual machine operating system. A terminal becomes a virtual machine console after the terminal is used to IPL a virtual device to initialize a guest operating system in the virtual machine. However, the same physical terminal communicates with the host operating system as well as a guest operating system. In other words, when a virtual machine logs on to the system, the virtual operator's console for that virtual machine is the keyboard of the actual terminal.) During an initial program loading by the system operator, module HCPCFM is entered to place the real system in console function mode awaiting commands. The virtual machine user of the guest virtual machine issues a LOGON command to the host system to initialize the user's virtual machine. (The LOGON command uses modules HCPLOG and HCPLGN.) In response to the LOGON command, the user's directory entry is read from a pre-established file. Using the information provided in the directory entries, LOGON requests module HCPBVM to construct the base VMDBK which defines the base CPU. (The directory can also IPL an operating system to be run on the newly created base CPU.) If the directory contains additional entries for adjunct machines, module HCPBVM repeatedly constructs additional VMDBKs each representing an adjunct processor. The additional VMDBKs are chained (along the VMDLCYCL chain) from the base VMDBK as shown in FIG. 4.

An adjunct VMDBK may share the characteristics of the guest VMDBK, in which case it may also share its I/O, or the adjunct VMDBK may differ from the guest VMDBK and have its own I/O. Wherever a virtual I/O configuration, as in the latter case, must be generated, the SCP attaches, links and provides simulations of the specified I/O as a series of attachments to the guest VMDBK.

Once virtual machine initialization has completed, the host SCP has created at least one VMDBK, at least one VDEV and segment tables all stored in the free storage and dynamic paging areas.

As soon as the virtual machine references an address in its virtual storage, CP builds page and swap tables. CP takes storage from the dynamic paging area for the page and swap tables, one page for each megabyte of virtual storage the virtual machine occupies.

The module HCPCFM is that part of the SCP that determines which of the VMDBKs in the guest virtual machine configuration is to be run and that manages and controls all requests by the guest machines to read or write information on the user's terminal (terminal I/O). Requests for terminal I/O can be initiated by a guest SCP (running on either a base or its adjunct CPU), by a service SCP running in a service adjunct, from the host system and/or from the system operator. If data, e.g. messages, could be written (displayed) a line at a time on the terminal's display, there would be no problem of mixed and/or partially completed messages. However, terminal video displays provide a full screen of data at a time such that permitting all of the above requests to occur simultaneously for a single terminal, i.e. requests to write to a single terminal display, would result in incomplete and jumbled messages, e.g. incomplete user-system dialog. Module HCPCFM prevents this problem from occurring by assigning "ownership" of the console to the VMDBK which represents the guest (base machine or adjunct machine) that made a request to, for example, perform I/O. The guest, whose request to perform I/O was granted, writes messages to the terminal display as though it "owned" the terminal when, in actuality, the messages are grouped on separate display images. The guest SCP writes to and reads from the terminal until the user presses a key to clear the system. If no messages are generated by the system, e.g. by a service adjunct machine, by host SCP communication to the guest, by (warning) messages from the operator of the host operating system or by other users, HCPCFM provides a "clear" interrupt to the guest SCP thereby blanking the terminal video display. This interrupt is received as though the guest were actually managing the (real) terminal, i.e. as though the user had pressed a CLEAR DISPLAY key on the terminal. If the system did generate messages, HCPCFM permits all of these messages to be written (and possibly responded to) before passing (reflecting) a "CLEAR DISPLAY" interrupt to the guest SCP. If the guest attempts to write to or read from the terminal while the system has been assigned to the terminal, HCPCFM causes the guest to receive a busy status until the system no longer "owns" the terminal. If a user does not clear the terminal within a predetermined reasonable time (depending on the urgency of the message being displayed on the terminal display), HCPCFM will clear the terminal itself. This module will also suspend the guest that is surrendering the terminal if it is not to execute simultaneously with the other guest. The terminal can be "swapped" back and forth between the base virtual machine and the adjunct virtual machine.

Example of Service Adjunct Machines Providing Services to a Main MP or UP Configuration A service adjunct machine can be loaded with a program that is used to examine the main configuration. For example, the program could provide a debugging service such that the debugging service adjunct machine would examine, test, change or otherwise debug an SCP running in the main configuration.

When a fatal error occurs in an adjunct machine, the error is treated the same way as an application program running in a virtual machine. Depending on the function in the adjunct machine, the function may be terminated or the virtual machine may be reset, and storage may be cleared.

Figure 6A:
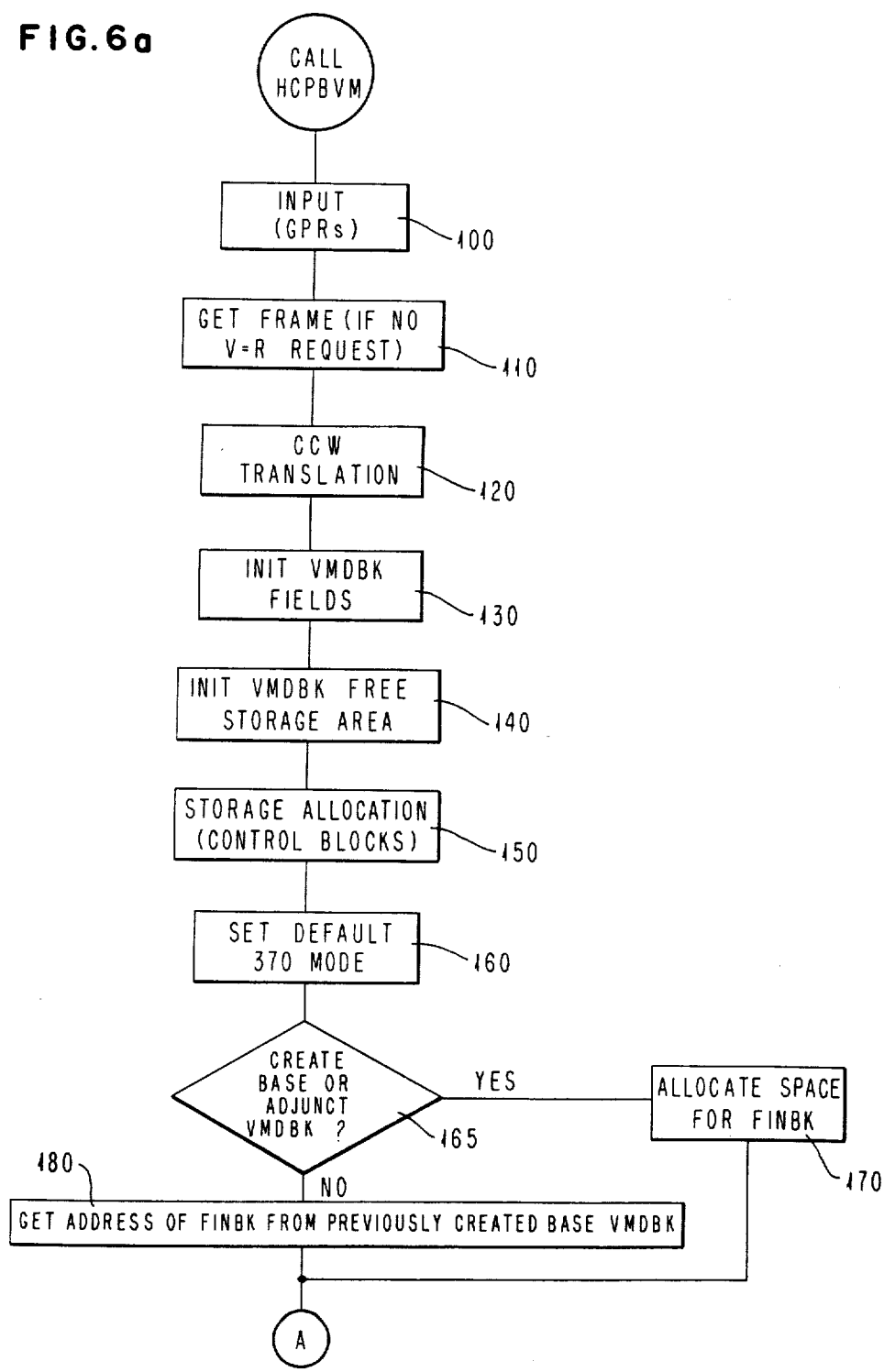

FIGS. 6a and 6b represent a flow chart showing how module HCPBVM builds a VMDBK.

Block 100 provides input parameters from several general purpose registers (GPRs). The parameters include the virtual machine type, the address of the terminal RDEV (if the user is identified this way) the address of the user's (requestor's) VMDBK, the address of the entry point to the module (HCPBVMBK) and the address of the save area. (When the module is exited, the address of the VMDBK created by the module is loaded into a predetermined GPR. See below.)

At block 110, a frame of real storage is obtained for the new VMDBK. The frame will contain the new VMDBK and will be flagged "CP" and locked. (A frame in storage is reserved for the new VMDBK if no request was made to establish a V=R (preferred guest) VMDBK.) The address of the VMDBK established at logon is provided in field VMDORIG in the new VMDBK and the address of the VMDBK owning the storage and I/O configuration for the guest MP configuration is provided in field VMDBASE of the new VMDBK.

Block 120 indicates that channel-command word (CCW) translation will be in effect. The CCW specifies the command to be executed and, for commands initiating I/O operations, designates the storage area associated with the operation and the action to be taken whenever transfer to or from the area is completed (as well as other options that are generally known in the art).

Block 130 provides for other fields in the VMDBK to be initialized depending upon the type of VMDBK being created. The type of VMDBK is coded in field VMDTYPE in the new VMDBK. (Other initialization involves scheduler fields and frame table pointers. The frame table pointers are initialized so that the user does not currently own frame table entries.) Block 130 also provides for the setting of dispatching status to console function wait. Default message levels are set and the user is flagged as not yet being logged on to the system. The user's page zero is flagged as being unavailable and placed in the "stop" state. A flag is set to indicate that the VMDBK will be dispatched on the master CPU only and a flag will be set to indicate that no shadow tables are present. The guest CPU ID is initialized to a default value, i.e. to host CPU ID, and all external interrupts will be set as pending and enabled (which the dispatcher will correct later.)

Block 140 initializes the VMDBK free storage area.

Block 150 allocates storage for control blocks such as a channel interrupt block, a savearea block and a timer request block for the virtual CPU timer. An instruction operand buffer is also allocated.

Block 160 provides for the System/370 mode default to be set.

Block 165 provides a test to determine whether the VMDBK being created is for a base machine or for an adjunct machine in a virtual MP configuration. (If the VMDBK being created is for either a adjunct machine or a base machine, then space will be allocated for the processor controller data block (FINBK) in the new VMDBK.)

Block 170 provides for the allocation of free storage for a FINBK if the VMDBK being created is for a base or an adjunct machine. Otherwise, block 180 provides for the address of the FINBK to be obtained from the (previously created) base VMDBK and stored in a field of the new VMDBK.

Block 185 initializes the guest's segment table entries to indicate that the segment is null, i.e. not normally addressable to the guest unless the segment has been attached, and invalid (no pages in core). Also initialized is the pointer to the guest's segment table origin.

Block 190 provides for the new VMDBK to intercept supervisor-call (SVC) interruptions. The SVC interruption occurs when the instruction SUPERVISOR CALL is executed. The SVC interruption causes the old program status word (PSW) to be stored at a predetermined real location and a new PSW to be fetched from a predetermined real location.

Block 200 provides a test to determine if the user is an AUTOLOGGED user or if the user is logging on to a type of terminal. In the former case, the new VMDBK is substantially created. Otherwise, the new VMDBK is further initialized on the basis of the type of terminal which is being used to log on. (An AUTOLOGGED user is a primary system operator whose virtual machine is automatically logged on during the SCP initialization process or is specified in a user's directory entry to be autologged.) Block 210 provides for the continuation of the initialization of the new VMDBK based on the type of user's terminal. The user will now be identified via a real device control block (RDEV).

Block 220 provides for the creation of a temporary logon ID for the new VMDBK.

Block 230 provides for the rew VMDBK to be patched into the cyclic list of VMDBKs currently active on the data processing system.

Once module HCPBVM has completed, a new VMDBK has been created, cleared, (partially initialized and chained to other VMDBKs. General purpose register 11 contains the address of the VMDBK just created.

Figure 7B:
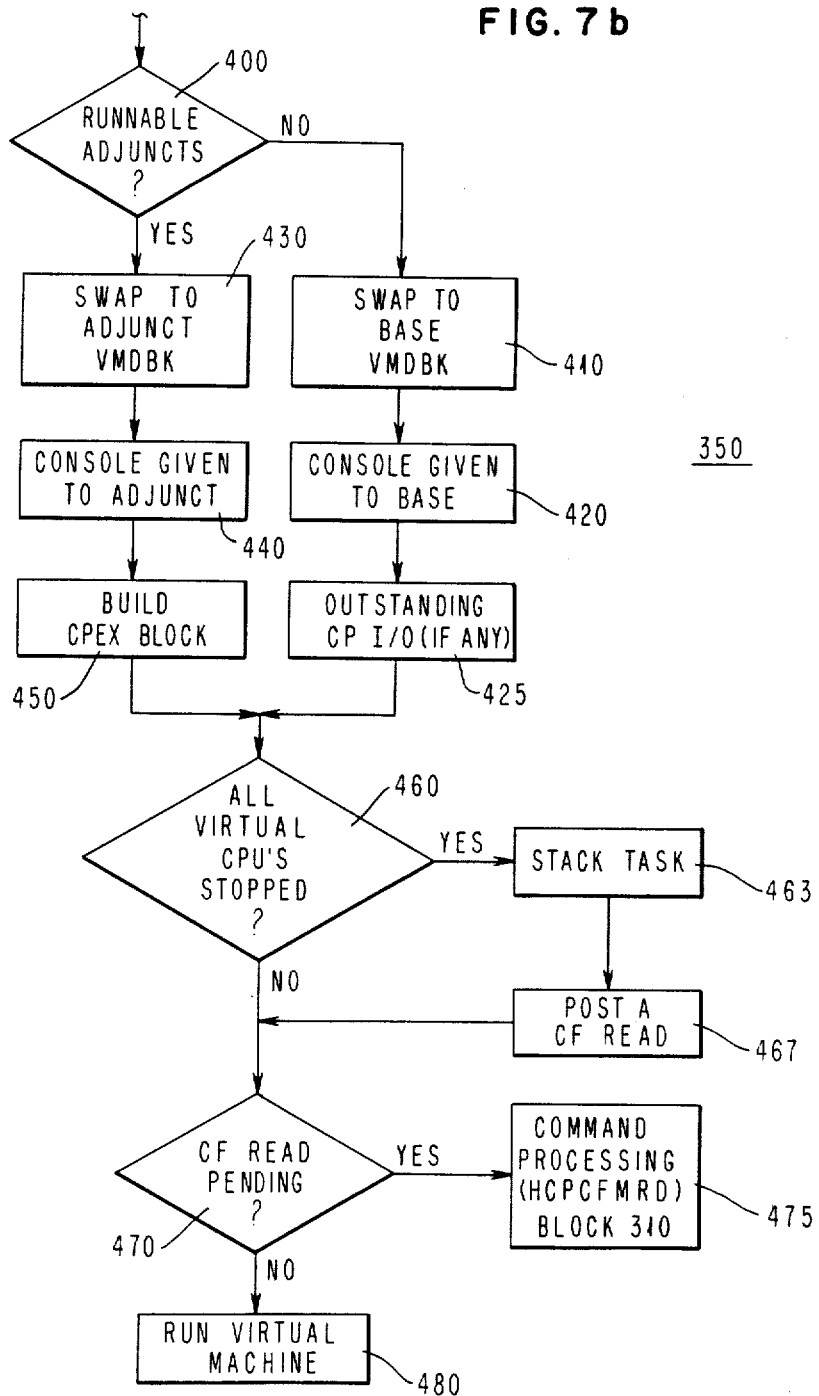

FIGS. 7a–7b show the flow chart representing the operation of module HCPCFM. The module generally handles CP READ (control program) requests from the user's terminal and directs them to the appropriate console function routine for processing and initiates CP function with the virtual MP held at ENDOP. (Console functions are those tasks that a system operator performs at the actual terminal. When all virtual MPs have stopped, HCPCFM determines which VMDBK has a special console function operation pending and passes control to that console function task.)

Block 300 provides for the input parameters required in order to read and process a command line. One of the most important input parameters is the user's VMDBK address.

Block 310 requires that each VMDBK in the local cyclic list (virtual MP system) must be at ENDOP (instruction end-of-operation) before console function processing can begin. (ENDOP indicates that no instruction simulation is active, i.e. that execution of the guest instruction stream is between instructions.) The cyclic list hold lock is obtained. Each VMDBK in the cyclic list is scanned, the local cyclic list lock is released and each VMDBK is brought to ENDOP. (HCPCFM sets a flag in the VMDBK that tells the virtual processor to stop at ENDOP when the SCP recognizes that a console function task is queued to be executed by HCPCFM.) The user exits the module to the dispatcher when an entry to console function mode (CFM) is requested and transfer is made to another VMDBK in the local cyclic list. The user also exits the module to the dispatcher when an entry to CFM is requested and not all VMDBKs (except the user's VMDBK) are at ENDOP. The user also exits the module when no more console function operations remain to be performed and the virtual machine(s) in the local cyclic list are set to run (unless a virtual machine is waiting for a response from a real device if a VMDBK is logging off). The user also exits the module when a higher priority function, other than entry to CFM, must be performed. (An error is produced, and the user exits the module, when the contents of field VMDCFDSP is not synchronized with the contents of field VMDCFCNT in the VMDBK. These fields are explained above.)

Block 320 provides for console function processing, e.g. CF READ requests, to begin (prompting the user for input data). At this point, all VMDBKs in the local cyclic list must be at ENDOP and any I/O response requests from VMDBKs logging off must be eliminated. (The SCP can simulate some functions for virtual CPUs only when all processors in the configuration have reached ENDOP.)

Block 330 examines the VMDFORCE bit in each VMDBK in the local cyclic list to determine whether any VMDBK is logging off. (The highest priority console function is the log off function.) If the VMDBK due to be logged off is not the user's VMDBK, then the module swaps to the logging off VMDBK. If the VMDBK that is logging off is not the base VMDBK, the module determines if the logging off VMDBK has ownership of the user's console. If it does, the ownership must be relinquished. The base VMDBK is dispatched. The LOGOFF procedure is then invoked and the non-base VMDBK is removed from the system.

Block 340 provides for the VMDBK containing the highest priority console function to be selected. If this VMDBK is the current VMDBK, then CFM proceeds. Otherwise, a switch is made to the selected (highest priority) VMDBK and HCPCFM is re-entered at a point following the already-completed ENDOP synchronization. The console is then used by this (highest priority) VMDBK. (In FIG. 7a, re-entry of HCPCFM is shown by line 345 which shows that module HCPCFM is re-entered just prior to the start of CF processing.) The following (highest to lowest) hierarchy establishes the preference of remaining CP function operations that can be performed:

1. process stacked console function output.
2. perform trace display if pending.
3. issue CFM call if pending (by examining the CPEBK).
4. execute command in a console function buffer.
5. issue pending console function read (lowest priority).

Notice that when the highest priority VMDBK is selected, the prior VMDBK, from which the switch (to the highest priority VMDBK) was made, is not logged off the system and the current VMDBK is not logged on to the system. In this way, one console is shared by each of the VMDBKs.

The "process stacked console function output" operation provides for console function output to be displayed. However, this operation will not provide CF output if the user is in the process of logging off or if the user has intervened and stopped the display of the line output.

If a pending CFM call originates on one VMDBK, but must execute on a different VMDBK, the "issue CFM call if pending" operation moves the pending CFM call from the VMDBK that originated it to the VMDBK which is meant to execute the CF. This may occur when the virtual machine operator uses the CPU command to direct a command to a CPU in a virtual configuration. If there is no CFM call, this operation will look for a console read.

Block 350 (shown in FIGS. 7a and 7b) indicates that console function processing is ended. All console functions are complete for the virtual configuration. The local cyclic list is scanned to determine whether there is any runnable adjunct machine. If there is a runnable adjunct machine, then a swap is made to the runnable adjunct machine which is linked to the console. If there is no runnable adjunct machine, the base virtual machine is linked to the console and a swap is made to the base machine.

FIG. 7b shows the events that occur when console function processing ends and the local cyclic list is scanned to determine whether there are any VMDBKs which are running (see block 350 above). Block 400 determines whether any adjunct machines, in the local cyclic list, are runnable. If there are no runnable adjunct machines, a swap (of the contents of GPR 11) is made such that GPR 11 points to the base machine VMDBK (block 410). The console ownership is given to the base machine (block 420) in a manner that is discussed below. (GPR 9 contains the return code.) If there is outstanding CP guest I/O, the full screen for an idle guest must be suspended to permit the presentation of the I/O (block 425). Otherwise, if there is a runnable adjunct machine, a swap (block 430) is made such that GPR 11 points to the adjunct machine VMDBK that is running. The console is then owned by this adjunct machine (block 440). A control program execution block, i.e. a CPEX block (or CPEBK), along with a save area are created in order for the adjunct machine to run (block 450).

In any case, if a CPU is runnable (block 460) then the virtual machine VMDBK is run (block 480) unless a CF READ is pending (block 470). If a CF READ is pending (see discussion of VMDCFPDR field in VMDBK), command processing occurs (block 475) and the CFM task is re-initiated (go to block 310). (In effect, module HCPCFM keeps looping until there are no more requests to process for the virtual configuration.)

If a CPU is not runnable (block 460), a console function READ is requested when "set run off" is in effect (block 467). If all CPUs are stopped, the task that was to be run is stacked (block 463) and a CF READ is made pending. (When the post console function READ is completed (see the explanation for the VMDCFPDR field above), GPR 1 will contain the address of the console read general system data block (GSDBK).)

The linking of the console to a specified VMDBK occurs in substantially the following manner.

1. The virtual device (VDEV) lock is acquired. (This is done after the output to the virtual console is quiesced.)
2. If a "wait" is required after the lock is acquired, the VDEV lock is dropped and the dispatcher is entered. Otherwise, the VDEV lock is held and the real device (RDEV) lock is acquired.
3. The pointers between an already linked virtual device block and the console real device block are cleared.
4. The RDEV and VDEV locks are released.
5. The real device block is attached to the virtual console device block for the base/adjunct VMDBK.
6. The RDEV and VDEV locks are then acquired and released. (The VDEV is a virtual device block which contains the description of a virtual device that is part of a virtual machine device configuration. It contains simulation and status information as well as other device characteristics. There is one VDEV for each virtual device in the configuration. The SCP uses the information in the directory to create the initial virtual device configuration. The RDEV is a real device block which contains the description of a real device that is part of the real device configuration of the real system. The RDEV also contains status information in addition to the device description.)

While the invention has been particularly shown and described with references to preferred embodiments thereof, it will be understood by those skilled in the art that the foregoing and other changes in form and details may be made therein without departing from the spirit and scope of the invention.

What I claim as new and desire to secure by Letters Patent is:

1. In a data processing system including at least one real machine having a real CPU, main storage, I/O devices and a host operating system program running in said real CPU for controlling said I/O devices, and a base virtual machine having a base virtual CPU and a guest operating system running in said base virtual CPU, the system further comprising a plurality of adjunct virtual machines, having adjunct virtual CPUs coupled to said base virtual CPU for providing for a host operating system program to be executed in said real CPU with a guest operating system program executed in said base virtual machine and at least one program executed in each of said plurality of adjunct virtual machines.

2. The data processing system of claim 1 in which at least one of said plurality of adjunct virtual machines is a simulated service processor for providing a service function to said base virtual machine.

3. The data processing system of claim 1 in which said base virtual machine and at least one of said plurality of adjunct virtual machines share the same console for sustaining a dialog between said base virtual machine and at least one of said plurality of adjunct virtual machines without loss of any console functions.

4. The data processing system of claim 2 in which said base virtual machine and said plurality of adjunct virtual machines are created from one directory and the VMDBK of said base virtual machine.

5. The data processing system of claim 4 in which a single directory entry defines the architecture of an adjunct virtual machine that services said base virtual machine and is different than the architecture of said base virtual CPU.

6. The data processing system of claim 5 in which an adjunct machine that services said base virtual machine is defined only once by said single directory as a prototype adjunct machine that is usable by any other base virtual machine.

7. The data processing system of claim 1 in which said at least one program is an application program.

8. The data processing system of claim 1 in which said at least one program is an operating system program.

9. The data processing system of claim 1 in which at least one of said adjunct virtual machines runs concurrently with said base virtual CPU.

10. The data processing system of claim 1 in which at least one of said adjunct virtual machines alternately runs with said base virtual machine.

11. The data processing system of claim 1 in which said plurality of adjunct machines have storage and I/O separate from said real machine.

12. The data processing system of claim 1 in which said adjunct virtual CPUs are loosely coupled to said base virtual CPU.

* * * * *